United States Patent [19]
Shimotsu et al.

[11] Patent Number: 5,953,473
[45] Date of Patent: Sep. 14, 1999

[54] CONNECTOR

[75] Inventors: Akihiro Shimotsu, Tokyo; Kozo Kiyotake, Kanagawa-ken, both of Japan

[73] Assignee: Hirose Electric Co., Ltd.

[21] Appl. No.: 09/013,182

[22] Filed: Jan. 26, 1998

[30] Foreign Application Priority Data

Jan. 24, 1997 [JP] Japan .................................. 9-011255

[51] Int. Cl.⁶ .................................................. G02B 6/38
[52] U.S. Cl. ............................................................ 385/56
[58] Field of Search ............................... 385/50–58, 147, 385/59, 60, 71–72, 78, 84; 439/316, 271, 347, 352, 59

[56] References Cited

U.S. PATENT DOCUMENTS 5,121,454   6/1992   Iwano et al. ................................. 385/60
5,528,711   6/1996   Iwano et al. ................................. 385/56
5,537,501   7/1996   Iwano et al. ................................. 385/58
5,673,346   9/1997   Iwano et al. ................................. 385/60

*Primary Examiner*—Akm E. Ullah
*Attorney, Agent, or Firm*—Kanesaka & Takeuchi

[57] ABSTRACT

The plug connector and the jack connector are connected to connect connection members attached to the contact elements. The plug connector comprises a plug connector element therein. The jack connector is provided with a removable jack connector element. The plug connector element has an engaging member which is removably plugged in the jack connector. When the plug connector and the jack connector are connected, the plug connector element and the connection member of the jack connector element are connected.

5 Claims, 8 Drawing Sheets

CONNECTOR

BACKGROUND OF THE INVENTION

1. Filed of the Invention

The present invention relates to connectors and, particularly, to a connector with a plug-locking mechanism.

2. Description of the Related Art

Connectors are used to connect articles. For example, plug and jack connectors are joined to make connection between optical fibers or electrical components.

Japanese patent application Kokai No. 45539/93 discloses such an optical connector for connecting optical fibers. The plug and jack connectors are fixed to circuit boards, respectively, and either or both of the boards are moved to plug the plug connector to the jack connector. A plurality of optical fibers are arranged side by side in the plug and jack connectors, respectively. Each optical fiber is covered by a sheath and provided with a ferrule and an arranging sleeve at an end to provide an optical connector element. The optical connector elements of the jack and plug connectors have complementary forms so that their front ends are able to fit to each other when the plug and jack connectors are plugged in. More specifically, the front end of the optical connector element for the plug connector is reduced, and the optical fiber projects from the reduced front end. The optical connector element of the jack connector has a cavity for receiving the reduced end of the plug connector so that the optical fiber of the plug connector is received in the center of the cavity. These optical connector elements are fitted to each other but not locked to each other. That is, these optical connector elements do not have any plug-locking mechanism. For the purpose of locking, a locking mechanism is provided on the connector body which supports the optical connector elements. Consequently, the optical connector elements are kept in connection by the locking mechanism of the connector body. Another connector has only a guide member provided on the connector body for plugging.

In still another optical connector, a plug connector is allowed to be plugged into a jack connector more than the necessary degree. When the plug connector is plugged into the jack connector beyond the necessary point where the optical connector elements are connected completely, the plug connector is received by the jack connector with a large play. To achieve this, an inside housing is provided in the outside housing of the plug connector. The inside housing is made slidable in the outside housing. The optical connector element is fixed to the inside housing. The inside housing is locked to the outside housing under the normal condition so that the inside housing is slidable only in the front section of the outside housing. However, when the lock is released, the inside housing is slidable into the rear section of the outside housing. The lock is released by the jack connector to release engagement between the inside and outside housings. This release is made by a member of the jack connector when the plug connector is plugged into the jack connector beyond the necessary point. Upon release, the inside housing is insertable to the deep position of the outside housing. Consequently, the plug connector is plugged in the jack connector beyond the necessary point. The plugged-in inside housing is brought into the original position by a pull-back member of the jack connector when the plug and jack connectors are separated. A hook member is provided in the inside housing of the plug connector for engagement with the pull-back member. The pull-back and hook members are fitted to each other to pull back the inside housing when the plug and jack connectors are plugged or the optical connector elements are connected. In addition, the pull-back and hook members serve as a locking mechanism to connect the plug and jack connectors. However, this connector also lacks a locking mechanism for the optical connector element but a locking mechanism on the connector body.

Where a locking mechanism is not provided on the optical connector element but only on the connector body, or the plug-in structure is not made by the plug-locking mechanism between the optical connector elements, tow or more joints are needed to connect the optical connector elements, and complicated connection and release operations are necessary, and the connection becomes unstable as the number of joints increases. If only one of the optical connector elements is replaced, the connection of all the connector elements must be released to release the locking mechanism of the optical connector element, making the operation complicated.

SUMMARY OF THE INVENTION

Accordingly, it is an object of the invention to provide a connector having a locking mechanism for each optical connector element to provide a plug-in structure for each optical connector element. The connector body, however, is provided with only a member cooperative with the locking mechanism provided on the optical connector element.

The connector element is made movable in the plug connector to provide stable connections between respective connector elements even if there is a gap between the plugged-in plug and jack connectors.

According to the invention there is provided a connector comprising a plug connector and a jack connector; the plug connector comprising a plug connector element to which a first connection member is connected, and a housing for slidably receiving the plug connector element; the jack connector comprising a removable jack connector element to which a second connection member is connected, and an adaptor housing for plug-locking the removable jack connector element; the plug connector element of the plug connector is plug-locked to the adaptor housing of the jack connector for connection with the jack connector element of the jack connector when the plug connector is plugged in the jack connector.

According to another aspect of the invention there is provided a connector comprising a plug connector and a jack connector; the plug connector comprising a plug connector element to which a first connection member is connected, and a housing for slidably receiving the plug connector element; the jack connector comprising a jack connector element to which a second connection member is connected, an adaptor housing for plug-locking the jack connector element, and a housing provided over the adaptor housing; the housing of the plug connector is engaged with the plug connector element but, when the plug connector is pressed against the jack connector beyond a predetermined degree, the housing of the jack connector releases the housing of the plug connector from the plug connector element so that the plug connector element becomes slidable within the housing; the plug connector element of the plug connector is plug-locked to the adaptor housing of the jack connector and connected to the jack connector element of the jack connector when the plug connector is plugged in the jack connector.

According to still another aspect of the invention there is provided a plug connector to be plugged in a jack connector, comprising: a plug connector element to be connected to a connection member; a housing for slidably receiving the plug connector element; the plug connector element being plug-locked to the jack connector and connected to a jack connector element of the jack connector when the plug connector is plugged in the jack connector.

According to yet another aspect of the invention there is provided a connector wherein the housing of the jack connector comprises a pull-back member which engages the connector element of the plug connector when the plug connector is plugged in the jack connector and brings the connector element to a position before the engagement is released.

According to another aspect of the invention there is provided a connector wherein each of the plug connector element and the jack connector element comprises a connector element body and a slider slidably attached to the connector element body, when the slider is moved with respect to the connector element body, its engagement with the adaptor housing provided on the connector element body is moved to release engagement between the connector element and the adaptor housing.

DESCRIPTION OF THE PREFERRED EMBODIMENT

Figure 1:
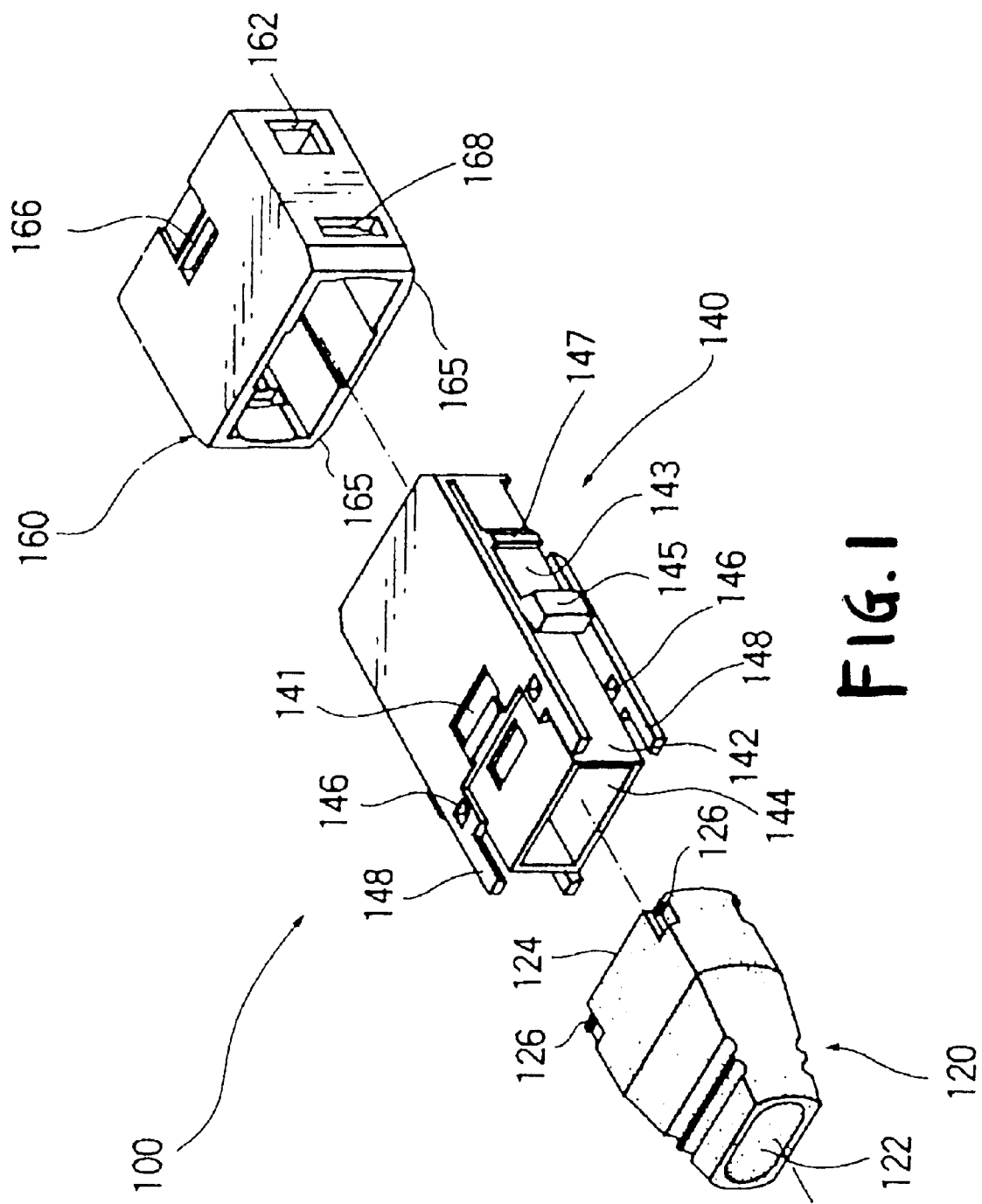
FIG. 1 is an exploded perspective view of a contact element according to an embodiment of the invention.

In FIG. 1, a connector element 100 comprises a holder 120, a frame 140, and a slider 160. The other components for fixing an optical fiber will be described later.

To assemble the connector element 100, the holder 120 is attached to the rear section of the frame 140, and the slider 160 is attached from front of the frame 140 to cover the rear section of the frame 140 and the front section of the holder 120 such that the slider 160 is slidable back and forth with respect to the frame 140 and the holder 120.

Such connector elements 100 are provided on both plug and jack connectors. The connector elements provided on the plug and jack connectors are called "plug connector element" and "jack connector element," respectively. The plug and jack connector elements, however, are identical in structure and function and, sometimes, called merely "connector elements."

Figure 2:
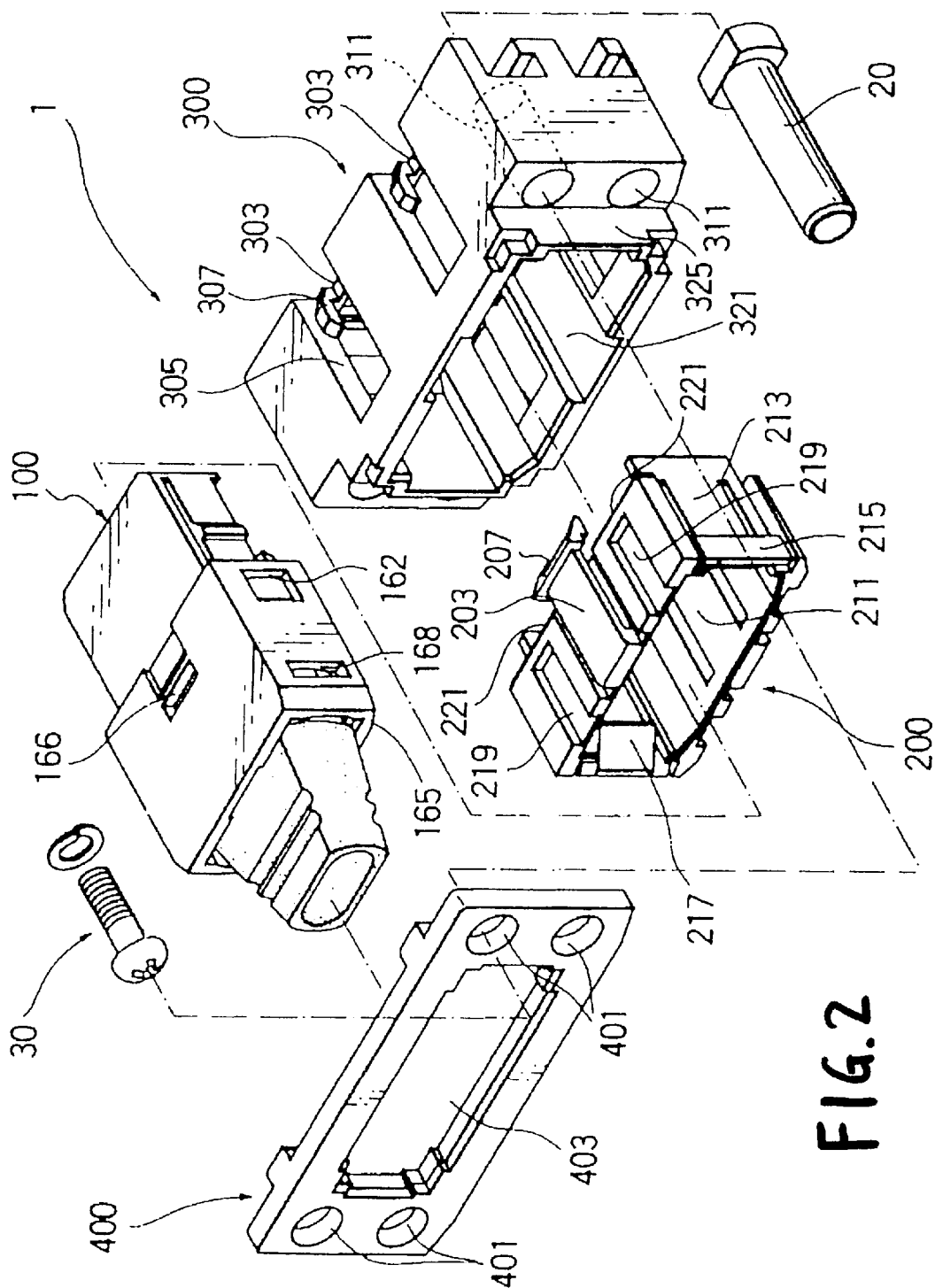
FIG. 2 is an exploded perspective view of a plug connector according to an embodiment of the invention.
Figure 4:
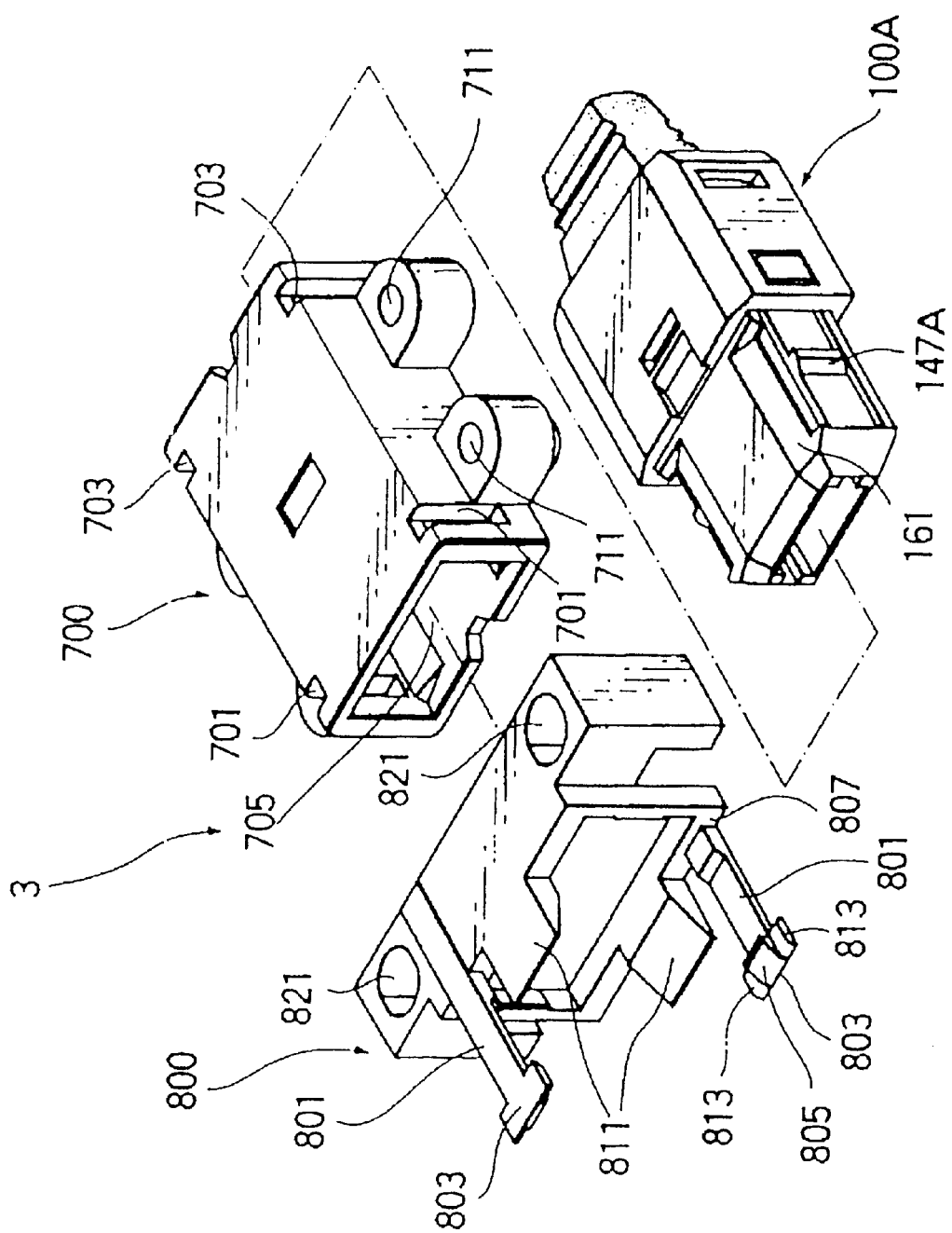
FIG. 4 is an exploded perspective view of a jack connector according to an embodiment of the invention.

The plug connector element 100 and the jack connector element 110A are shown in the upper left corner of FIG. 2 and the lower right corner of FIG. 4, respectively. However, the plug connector element 100 is incorporated in the plug connector 1 as shown in FIG. 2 while the jack connector element 100A is not incorporated but removable from the jack connector 3 as shown in FIG. 4.

In FIG. 2, the plug connector 1 comprises an inside housing 200, an outside housing 300, a back housing 400, a fixing metal 20, and a bolt 30.

To assemble the plug connector 1, the inside housing 200 is attached to the rear section of the connector element 100. The inside housing 200 with the connector element 100 is then incorporated in the outside housing 300 such that the front and rear portions of the connector element 100 are exposed from the outside housing 300. The inside housing 200 is slidable within the outside housing 300 in the assembling direction. The back housing 400 is attached to the rear end of the outside housing 300 with the fixing metal 20 and the bolt 30.

FIGS. 3(a), (b), and (c) are side, top, and front views of the assembled jack connector. In FIGS. 3(a) and 3(b), the upper halves are shown in section taken along vertical and horizontal lines of FIG. 3(c), respectively. These figures show how respective components are connected.

Referring back to FIG. 1, the holder 120 is a member through which a plurality of optical fibers are placed. A through-hole 122 is provided in the holder 120 to let the optical fibers go to the frame 140. The holder 120 has a front opening 124 which is fitted over the rear rectangular section 142 of the frame 140. Four projections 126 are provided on upper and lower opposite sides of the holder 120 to secure the holder 120. The holder 120 is made from a flexible material, such as a plastic, to tolerate a little movement of the optical fibers.

The optical fibers are then put through a through-hole 144 provided in the frame 140. Four openings 146 are provided in the rear section of the frame 140 to receive the four projections 126 of the holder 120 such that the holder 120 is attached over the rear section 142 of the frame 140 but inside the four columns 148. When the holder 120 is attached to the frame 140, the through-holes 122 and 144 of the holder and frame are communicated to let the optical fibers go to the front end of the frame 140.

A pair of indentations 141 are provided in upper and lower faces of the frame 140 to engage slidable engaging projections 164 of the slider 160 as shown in FIG. 3(a). A pair of resilient side arms 143 (FIG. 1) extend rearwardly from the front end of the frame 140 to be flexible inwardly and outwardly. Each resilient side arm 143 has a first engaging projection 145 and a second engaging projection 147. As shown in FIG. 3(b), the first engaging projection 145 slidably engages a side opening 162 of the slider 160 while the second engaging projection 147 engages one of four engaging openings 701 and 703 of a PA adaptor housing 700 (FIGS. 4 and 5) when the connector element 100 is plugged in the PA adaptor housing 700. The second engaging projections 147 are released from the engaging openings 701 and 703 by operation of the first engaging projections 145 and the resilient arms 143 as described hereinafter.

As FIGS. 3(a) and (b) show, a ferrule 40 is attached to one of the front ends of a plurality of optical fibers. A stopper 151, a spring 153, and a spacer 155 are provided in the frame 140 to hold the ferrule 40 in place. The stopper 151 is provided in the rear section of the frame 140 to hold one end of the spring 153. The spring 153 provided between the stopper 151 and the spacer 155 to push the spacer 155 forwardly. The spacer 155 is in contact with the ferrule 40 and pushes it forwardly. Consequently, the ferrule 40 projects forwardly from the connector element.

Figure 3:
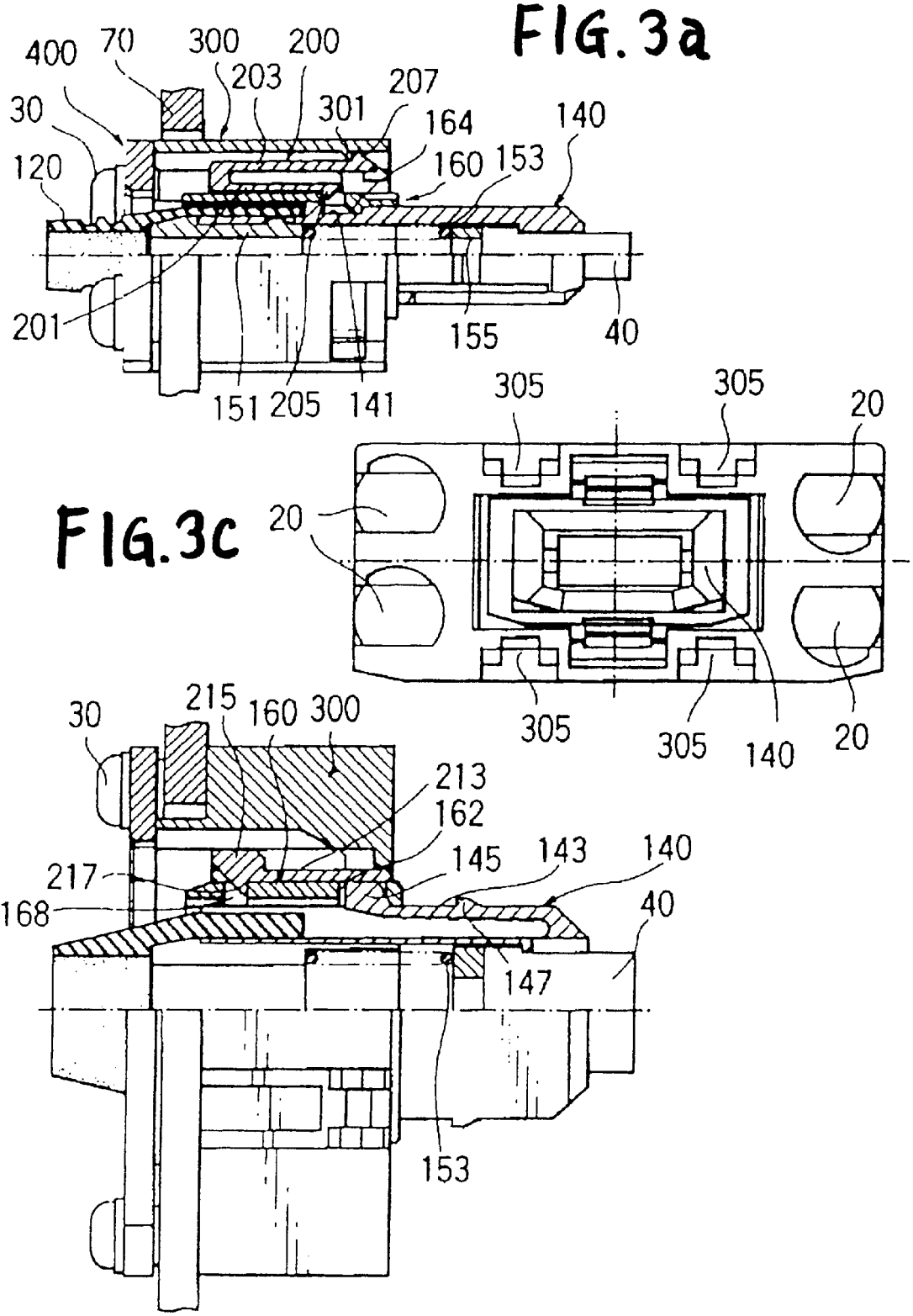
FIGS. 3(a), (b), and (c) are side, top, and front views of the plug connector fixed to a board.

As FIG. 1 shows, the slider 160 of the plug connector element 100 has a rectangular cylindrical form to receive the frame 140 and the holder 120. When the slider 160 is attached to the frame 140 and the holder at a predetermined position, it covers only the rear section of the frame 140 and the front section of the holder 120. As FIGS. 2 and 3 show, the front section of the frame 140 and the rear section of the holder 120 project from the slider 160. The slider 160 is movable in the direction from the holder 120 to the frame 140.

As FIG. 3(a) shows, a pair of slidable engaging projections 164 extend inwardly from the front ends of a pair of engaging openings 166 provided on the upper and lower surfaces of the slider 160 (FIG. 1). The engaging openings 166 engage the inside housing 200. When the slider 160 is inserted into the frame 140 from front, the slidable engaging projections 164 engage the indentations 141 (FIG. 1) provided on the upper and lower surfaces of the frame 140 to connect the frame 140 and the slider 160. The size of the indentations 141 is sufficiently large to allow the slider 160 to move back and forth with respect to the frame 140. Either upper or lower surface of the slider 160 is tapered at 165 (FIG. 2) to determine the orientation of the plug connector element 100 with respect to the inside housing 200.

As FIGS. 1 and 3(b), a first side opening 162 and a second side opening 168 are provided in each side face of the slider 160. The first side opening 162 slidably engages the first side engaging project 145 provided on the resilient arm 143 of the frame 140 while the second side opening 168 engages the inside housing 200. When the slider 160 is inserted into the frame 140, the first side engaging projection 145 snaps in the first side opening of the slider 160. The size of the first side opening 162 is sufficiently large to allow the slider 160 to move back and forth with respect to the frame 140. When the slider 160 is moved rearwardly with respect to the frame 140, the first side engaging projection 145 of the frame is at a position closest to the first side opening 162 of the slider 160. When the slider 160 is moved further rearwardly, the first side engaging projection 145 is moved inwardly toward the frame 140 by movement of the resilient arm 143. To facilitate the movement, the first side engaging projection 145 is provided with a slant surface outwardly from front to back and the front side of the first side opening 162 is provided with a slant surface complementary to the above. The second side engaging projection 147 also is moved inwardly to the frame along with the first side engaging projection 145 to help release of the engagement between the connector element and the PA adaptor housing 700 of the jack connector 3 (FIGS. 4 and 5). In FIG. 3(b), the first side engaging projection 145 is at a position closest to the front edge of the first side opening 162 of the slider, but the second engaging projection 147 is not moved yet inwardly to the frame 140.

As FIGS. 2 and 3(a) and 3(b) show, the inside housing 200 is fixed to the slider 160 of the connector element 100. The inside housing 200 has a rectangular cylindrical form with a rectangular opening 211 to receive the slider 160 of the plug connector element 100. The inside housing 200 is attached to the connector element 100 from front.

As FIG. 3(a) shows, the inside housing 200 has a support member 201 with an inward engaging projection 205 and a resilient movable member 203 with an outward engaging projection 207. The outward engaging projection 207 and the inward engaging projection 205 extend outwardly and inwardly, respectively. The outward and inward engaging projections 207 and 205 are connected at the rear ends via the support member 202 and resilient movable member 203, respectively. The movement of the outward engaging projection 207 is helpful for engagement and release of the outside housing 300. The inward engaging projection 205 connects the inside housing 200 to the slider 160 of the connector element 100. When the connector element 100 is inserted into the inside housing 200 via the rectangular opening 211, the inward engaging projection 205 of the inside housing 200 snaps in the engaging opening 166 (FIG. 2) of the slider 160. The support member 201 for the inward engaging projection 205 is not flexible so that usual forces do not separate the inward engaging projection 205 from the engaging opening 166.

In FIGS. 2 and 3(a), the inside housing 200 is also fixed to the sides of the slider 160. The inside housing 200 has a pair of side faces having a side resilient member 213 with a hook 215 provided at the free end. An inward projection 217 extends inwardly from the hook 215. When the connector element 100 is inserted into the inside housing 200, the inward projection 217 of the hook 215 snaps in the second side opening 168 of the slider 160 to complete the engagement between the inside housing 200 and the slider 160. A pair of recesses 219 extend forwardly from the rear end of each of upper and lower faces of the inside housings 200 to engage projections 805 (FIG. 4) provided on the T-shaped section 803 of the PA housing 800 of the jack connector as described hereinafter.

In FIGS. 2 and 3, the outside housing 300 covers almost all the connector elements 100 to which the inside housing 200 is attached, forming an outer shell of the plug connector 1. The inside housing 200 and the connector element 100 are inserted into an insertion section 321 of the outside housing 300 from back. The length of the outside housing 300 in the insertion direction is larger than the length of the inside housing 200 so that the inside housing 200 and the connector element 100 are slidable within the outside housing 300. If the size of the insertion section 321 of the outside housing 300 is made larger than the size of the inside housing 200, the inside housing 200 is slidable within the outside housing 300 so that when the front end of the connector element 100 is connected to the PA adaptor housing 700 of the jack connector 3 (FIG. 4), a small gap between the plug connector 1 and the jack connector 3 is tolerated. As FIG. 3 shows, when the entire inside housing 200 or the entire slider 160 is received by the outside housing 300, the front section of the frame 140 and the rear section 120 of the holder 120 project from the openings in the front and rear faces of the outside housing 300.

In FIG. 3(a), central engaging projection 301 is provided at the front portion of each of upper and lower inner surfaces of the outside housing 300. The central engaging projection 301 is provided at the center of the front portion of the outside housing 300 corresponding to the outward engaging projection 207 of the inside housing 200. When the inside housing 200 is inserted into the outside housing 300 to a predetermined distance, the central engaging projection 301 abuts against the outward engaging projection 207 of the inside housing 200. When the connector element 100 is moved further forwardly, the outward engaging projection 207 of the inside housing is moved downwardly by the central engaging projection 301. The outward engaging projection 207 of the inside housing passes the central engaging projection 301 of the outside housing, the outward engaging projection 207 is returned to an upper position by the resilient movable member 203. At this point, the inside housing 200 is accommodated by the outside housing 300 completely. The engagement between the outward and central engaging projections 207 and 301 is released by the jack connector 3 (FIG. 4) but, under the normal condition, it is not released. As long as the outward engaging projection 207 engages the central engaging projection 301, the plug connector element 100 is not moved rearwardly beyond such a position as shown in FIGS. 3(a) and (b) in the outside housing 300. However, the plug connector element 100 is slidable toward the front end of the outside housing at a predetermined distance during the engagement between the outward and central engaging projections 207 and 301. The plug connector element 100 is slidable until the front ends 221 of upper and lower faces of the inside housing 200 abut against frames 303 (FIG. 2) provided on upper and lower faces of the outside housing 300. The abutment prevents the connector element 100 from falling off from the front section of the outside housing 300. When the connector element 100 is at the most front position, or the front ends 221 of the inside housing 200 abut against the frames 303 of the outside housing 300, the inside housing 200 does not project from the outside housing 300 but only the tip of the outward engaging projection 207 and the end portion of the side resilient member 213 (FIG. 2) project from the outside housing 300.

In FIG. 2, a pair of cutouts 305 extend rearwardly from the front edges of upper and lower faces of the outside housing 300 and are closed by the frames 303 such that the recesses 219 of the inside housing 200 are exposed. The frames 303 are provided with protruded slant portions 307. The protruded slant portions 307 are provided such that the T-shaped section 803 of the pull-back extension 801 (FIG. 4) provided on the PA housing 800 of the jack connector 3 passes the frame 303 of the outside housing 300 and is released from the inside housing. The protruded slant portion 307 is provided with a notch at the central position so as to allow passage of a projection 805 (FIG. 4) provided on the T-shaped section 803 of the pull-back extension 801.

In FIGS. 2 and 3(a) and 3(b), the rear section of the outside housing 300 is inserted into a through-hole of a board 70 and closed by the back housing 400 which is fixed to the rear section of the outside housing 300 with the fixing metal 20 and bolt 30. The fixing metal 20 is put through a through-hole 311 of the outside housing and a through-hole of the board 70 until it projects into a through-hole 401 of the back housing 400. The bolt 30 is screwed into the fixing metal 20 via these through-holes. The size of the through-hole in the board 70 is made larger than the size of the protruded section 325 of the outside housing and the four through-holes 311 provided around the protruded section so that the plug connector is adjustable within the through-hole of the board 70. Consequently, when the plug connector 1 is plugged into the jack connector 3, a small gap between the plug connector 1 and the jack connector 3 is tolerated. An opening 403 is provided in the back housing 400 so that when the back housing is attached, the rear section of the holder of the plug element 100 projects through the opening 403. The opening 403 is made smaller than the inside housing 200 so that the inside housing 200 does not fall from the opening 403 but larger than the plug connector element 100 so that when the plug connector element 100 is broken down, only the plug connector element 100 is removed through the opening 403, without removing the inside housing 200, by releasing the engagement between the plug connector element 100 and the inside housing 200. Also, the size of the opening 403 is made sufficiently large to allow the connector element 100 to slide within the outside housing 300.

FIG. 4 shows the jack connector 3 with the front end having a complementary form to the front end of the plug connector 1 in FIG. 2. The jack connector 3 comprises a PA adaptor housing 700 and a PA housing 800. The PA housing 800 is attached to the PA adaptor housing from front. The PA housing 800 is made either separately from or integrally with the PA adaptor housing 700.

Figure 5A:
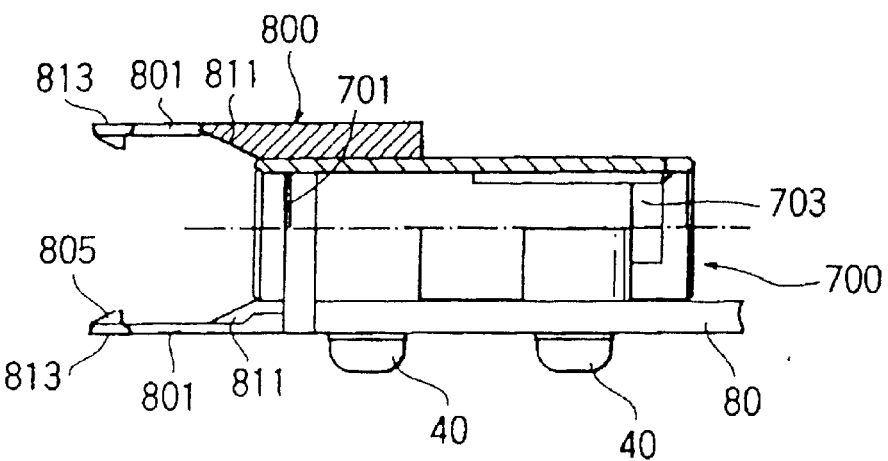
FIGS. 5(a), (b), and (c) are side, top, and front views of the jack connector fixed to a board.
Figure 5B:
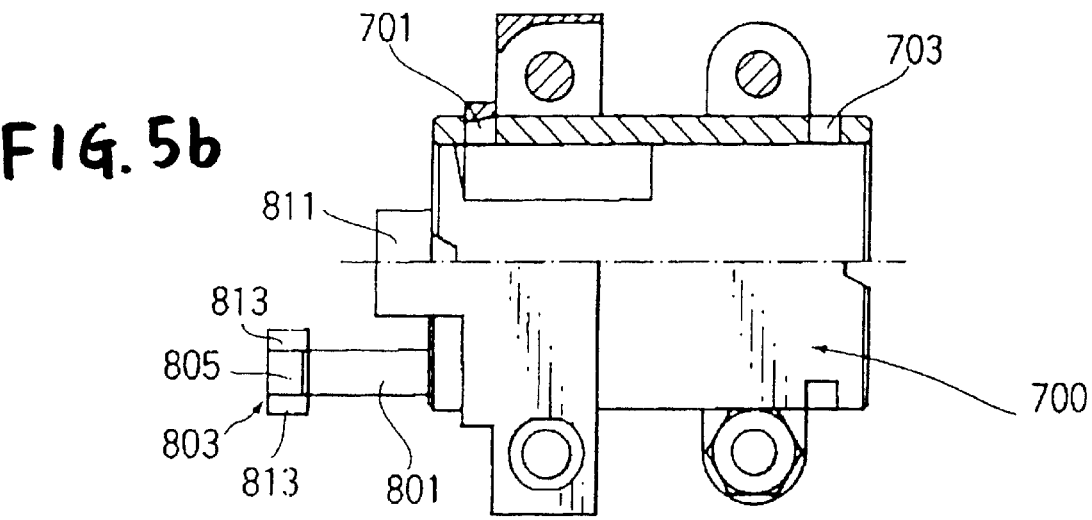
Figure 5C:
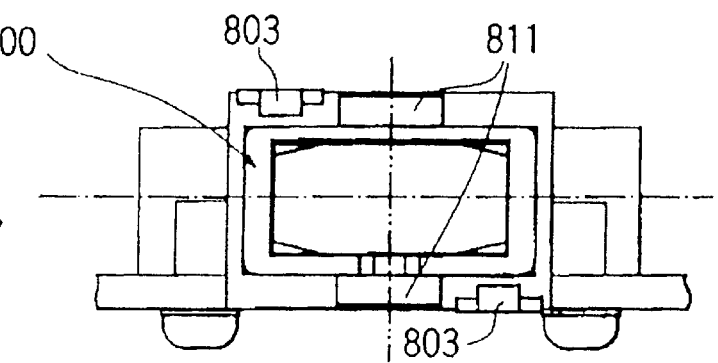

FIGS. 5(a), (b), and (c) are side, top, and front views of the jack connector, respectively, fixed to the board 80. The upper half in FIG. 5(a) shows a section taken along the vertical line in FIG. 5(c) and the upper half in FIG. 5(b) shows a section taken along the horizontal line in FIG. 5(c). FIGS. 5(a)–(c) show how the PA adaptor housing 700 is connected to the PA housing 800.

The PA adaptor housing 700 of FIGS. 4 and 5 receives the front section of the plug connector element 100 (FIG. 2) or the jack connector element 100A (FIG. 4). The optical fibers supported by the plug and jack connector elements 100 and 100A are brought into contact within the PA adaptor housing 700. The PA adaptor housing 700 is provided with a through-hole 705 to receive the connector elements 100 and 100A from opposite directions, with the orientation of the connector elements reversed. For example, if the plug connector element 100 is inserted into the through-hole 705 of the PA adaptor housing 700 such that it has a lower tapered edge, then the jack connector element 100A is inserted into the through-hole 705 of the PA adaptor housing 700 such that it has an upper tapered edge 161. These orientations correspond to those of the connector elements 100 and 100A in FIGS. 2 and 4. In place of the through-hole for receiving the jack connector element 100A, a board may be provided to mount various optical device components. Thus, the plug connector element 100 received in the through-hole provided on only one side of the PA adaptor housing 700 is connected directly to the various optical devices instead of the jack connector element 100A.

In FIGS. 4 and 5(a) and (b), engaging openings 701 and 703 are provided in each side of the PA adaptor housing 700 to connect the PA adaptor housing to the connector elements 100 and 100A. The four engaging openings 701 and 703 are provided in opposite sides of the PA adaptor housing corresponding to the second engaging projections 147 (FIG. 1 or FIG. 3(b)) and 147A (FIG. 4). The two front engaging openings 701 are used to engage the plug connector element 100 (FIG. 2) and the two rear engaging openings 703 engage the jack connector element 100A (FIG. 4). When the front sections of the connector elements 100 and 100A are inserted, the engaging openings 701 and 703 in the PA adaptor housing 700 engage the second engaging projections 147 (FIG. 1 or FIG. 3(b)) and 147A (FIG. 4). When the frame 140 of the connector element 100 is moved forwardly with respect to the slider 160, the second engaging projections 147 and 147A are moved rearwardly along with the first engaging projections 145 and 145A of the frame 140 and released from the engaging openings 701 and 703 of the PA adaptor housing 700. As long as the frame 140 and the holder 120 (FIG. 1) of the connector elements 100 and 100A are not moved forwardly with respect to the slider 160, the connector elements 100 and 100A are not released from the PA adaptor housing 700.

In FIG. 5, the PA housing 800 has a rear section having a form corresponding to the front section of the PA adaptor housing 700 such that the PA housing 800 is attached to the front section of the PA adaptor housing 700. The PA adaptor housing 700 is inserted into the PA housing 800 from back and fixed at a position that the front section of the PA adaptor housing 700 projects from the frame 807 (FIG. 4) of the PA housing 800.

In FIG. 4, a central engaging projection 811 is provided at the center of each of upper and lower faces of the PA housing 800 for releasing the engagement between the outward engaging projection 207 of the inside housing 200 and the central engaging projection 301 (FIG. 3(a)) of the outside housing 300. The central engaging projection 811 has an outwardly slant face which is complementary to the outward engaging projection 207 of the inside housing 200.

In FIG. 4, one or a pair of pull-back extensions 801 are provided beside the upper and lower central engaging projections 811 so as to face each other. The pull-back extensions 801 are used to engage the outward engaging projection 207 of the inside housing 200 and the central engaging projection 301 (FIG. 3(a)) of the outside housing 300 after release. However, no locking mechanism for the plug and jack connectors is provided so that it is not necessary to connect the plug and jack connectors. The pull-back extension 801 is flexible upwardly so that the T-shaped section 803 is movable upwardly. When the plug and jack connectors are connected, the T-shaped section 803 passes the protruded slant face 307 (FIG. 2) provided in front of the cutout 305 in the outside housing 300. The protruded slant face 307 is provided with a notch so that when the T-shaped section 803 passes the protruded slant face 307, the projection 805 provided at the center of the T-shaped section 803 passes. A pair of flat sections 813 are provided on opposite sides of the projection 805 so that when the T-shaped section 803 passes the protruded slant face 307, it contacts the protruded slant face 307 only on the flat sections 813. After the projection 805 of the T-shaped section 803 passes the protruded slant face 307, it engages the recess 219 of the inside housing 200 via the cutout 305.

Figure 6A:
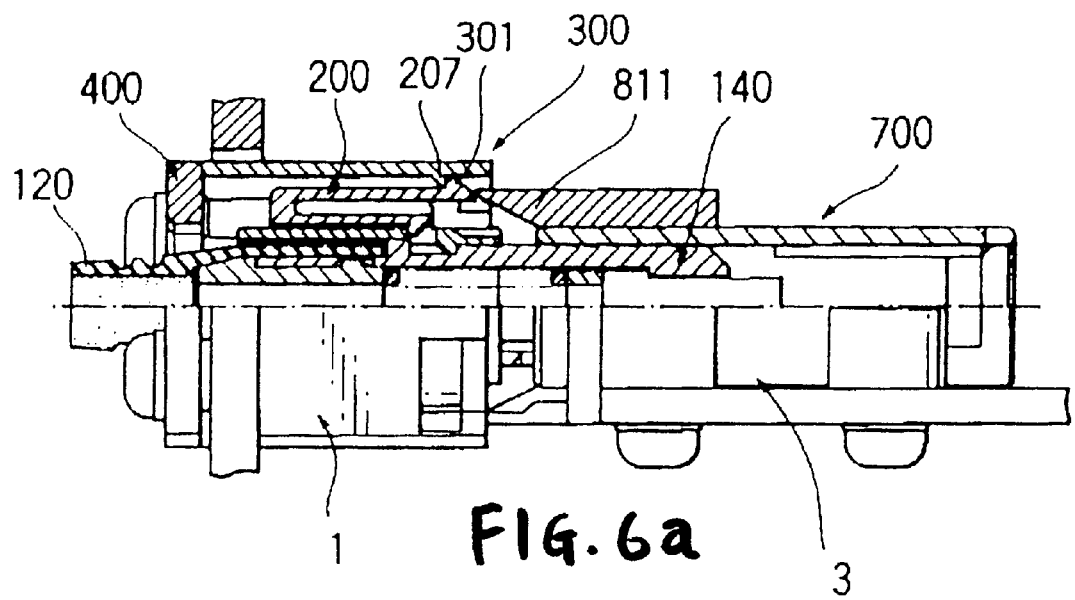
FIGS. 6(a) and (b) are side and top views of the plug and jack connectors before the engagement between inside and outside housings is released.

FIGS. 6(a) and (b) are side and top views of the plug connector 1 plugged in the jack connector 3. The outward engaging projection 207 and the central engaging projection 301 are engaged.

The plug connector 1 is plugged into the jack connector 3 by fitting the front section of the frame 140 of the plug connector into the PA adaptor housing 700 of the jack connector. When the front section of the frame 140 is inserted into the PA adaptor housing 700 via the through-hole 705 (FIG. 4), the second engaging projection 147 of the frame 140 snaps in the engaging opening 701 of the PA adaptor housing 700 to complete engagement between the plug connector 1 and the jack connector 3. Also, the pull-back extension 801 of the PA housing 800 is in engagement with the inside housing 200 of the plug connector 1 as shown by broken line in FIG. 6(b). The T-shaped section 803 of the projection 805 (FIGS. 4 or 5) engages the recess 219 (FIG. 2) of the inside housing 200 via the cutout 305 of the outside housing 300.

Figure 7A:
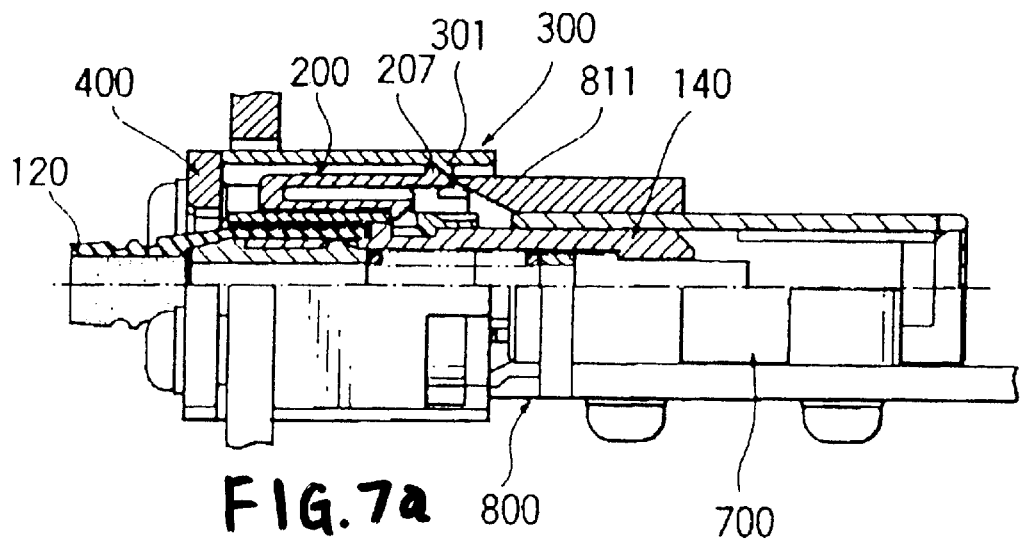
FIGS. 7(a) and (b) are side and top views of the plug and jack connectors after the engagement between inside and outside housings is released.

The engagement between the outward engaging projection 207 of the inside housing 200 and the central engaging projection 301 of the outside housing 300 is not released under the normal condition under which the plug connector is not plugged in the PA adaptor housing 700. In FIG. 6(a), the outward engaging projection 207 of the inside housing and the central engaging projection 301 of the outside housing are engaged such that their upright faces are abutted to each other. When the plug connector 1 is inserted into the jack connector 3 beyond the necessary point, the central engaging projection 811 of the jack connector 3 moves downwardly the outward engaging projection 207 of the inside housing 200. When the plug connector 1 is further inserted into the jack connector 3, the outward engaging projection 207 of the inside housing 200 passes the central engaging projection 301 of the outside housing 300. Consequently, the engagement between the outward engaging projection 207 of the inside housing and the central engaging projection 301 of the outside housing is released. FIG. 7 shows the released condition.

When the plug connector 1 is inserted into the jack connector 3 to a certain degree after the engagement between the outward engaging projection 207 and the central engaging projection 301 is released, the inside housing 200 abuts against the back housing 400 so that no further insertion is possible. Thus, the lock between the front section of the frame 140 and the PA adaptor housing 700 of the jack connector 3 is not released so that the spacial relationship between the jack connector 3 and the plug connector element 100 is maintained. That is, before and after release of the engagement, both the jack connector 3 and the plug connector element 100 are moved rearwardly with respect to the outside housing 300.

Figure 6B:
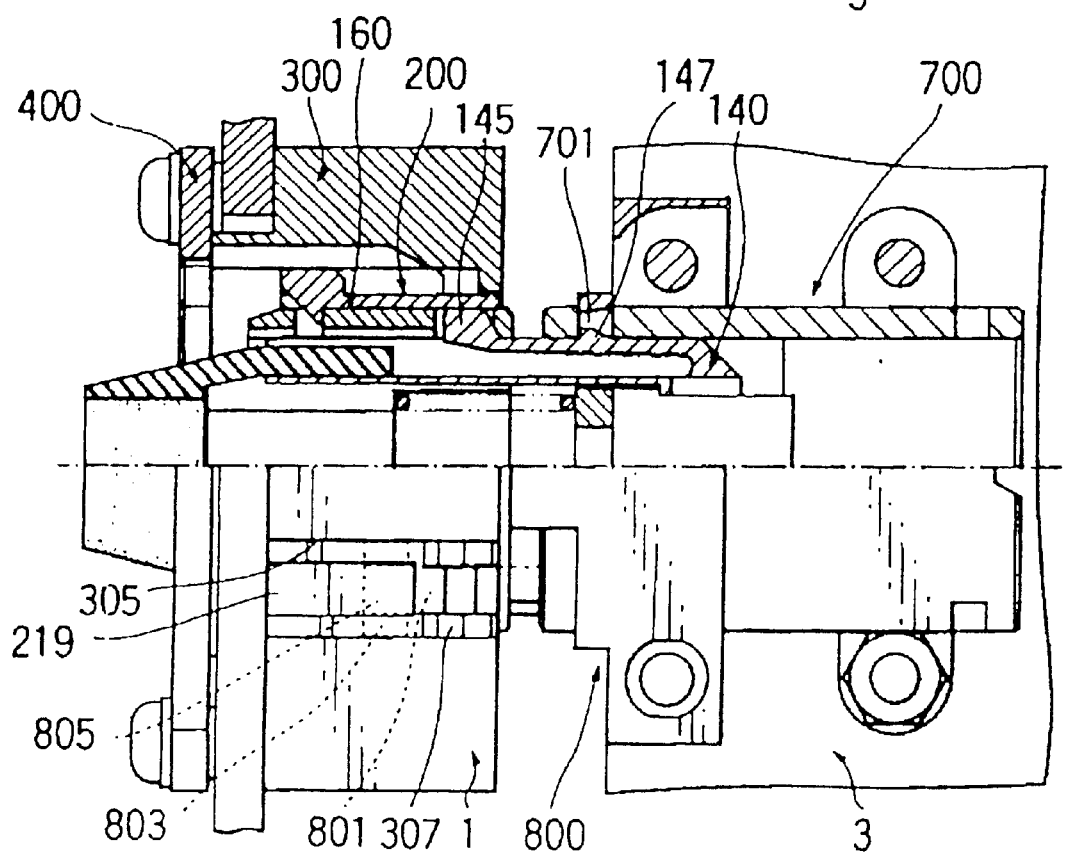
Figure 7B:
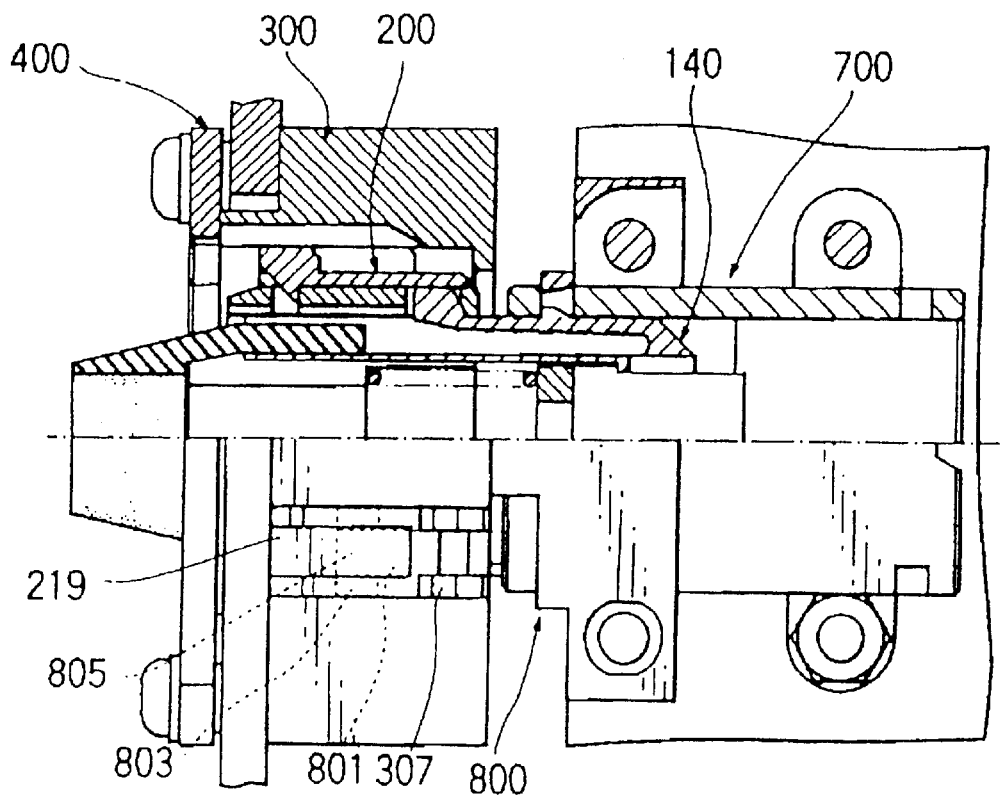

To engage again the outward engaging projection 207 and the central engaging projection 301, it is only necessary to move the plug connector 1 away from the jack connector 3. Since the frame 140 of the plug connector element is locked to the PA adaptor housing 700 of the plug connector 3, the jack connector 3, the frame 140, and the holder 120 are pulled forwardly with respect to the outside housing 300. When the plug connector 1 is drawn from the jack connector 3 to a certain degree, with the plug connector element 100 and the jack connector element 100A engaged, the outward engaging projection 207 of the inside housing 200 passes the central engaging projection 301 of the outside housing 300 to the original condition as shown in FIG. 6. The pull-back extension 801 (FIG. 4) of the PA housing 800 helps such a pull-back operation as described above. As FIGS. 6(b) and 7(b) show, the projection 805 (FIG. 4) provided on the T-shaped section 803 of the pull-back extension 801 remains engaged with the recess 219 of the inside housing 200 during the pull-back operation so that the pull-back extension 801 is able to pull back the inside housing 200 and the plug connector element 100 through the engagement. However, the pull-back extension 801 is only an auxiliary member, and the pull-back operation is achieved through the engagement between the connector element 100 and the PA adaptor housing 700.

When the plug connector 1 is moved further away from the jack connector 3 after the pull-back of the plug connector element 100, the T-shaped section 803 of the PA housing 800 passes the protruded slant face 307 (FIG. 2) of the outside housing, releasing the engagement with the recess 219 of the inside housing 200. When the plug connector 1 is moved further away from the jack connector 3, the engagement between the plug connector 1 and the jack connector 3 is released. More specifically, when the plug connector 1 is moved away from the jack connector, the plug connector element 100 is moved forwardly with respect to the outside housing 300. When the plug connector 1 is moved further away from the jack connector 3 after the plug connector element 100 (or the inside housing 200) is brought to the uttermost front position within the outside housing 300, only the front section of the frame 140 of the plug connector element 100 plugged in the PA adaptor housing 700 of the jack connector 3 is pulled back, with the slider 160 left out. Consequently, as shown in FIG. 6(b), the second engaging projection 147 of the frame 140 is moved inwardly toward the frame 140 through the operation of the first engaging projection 145 and the slider 160 and released from the engagement with the engaging opening 701 of the PA adaptor housing 700 of the jack connector 3.

Figure 8:
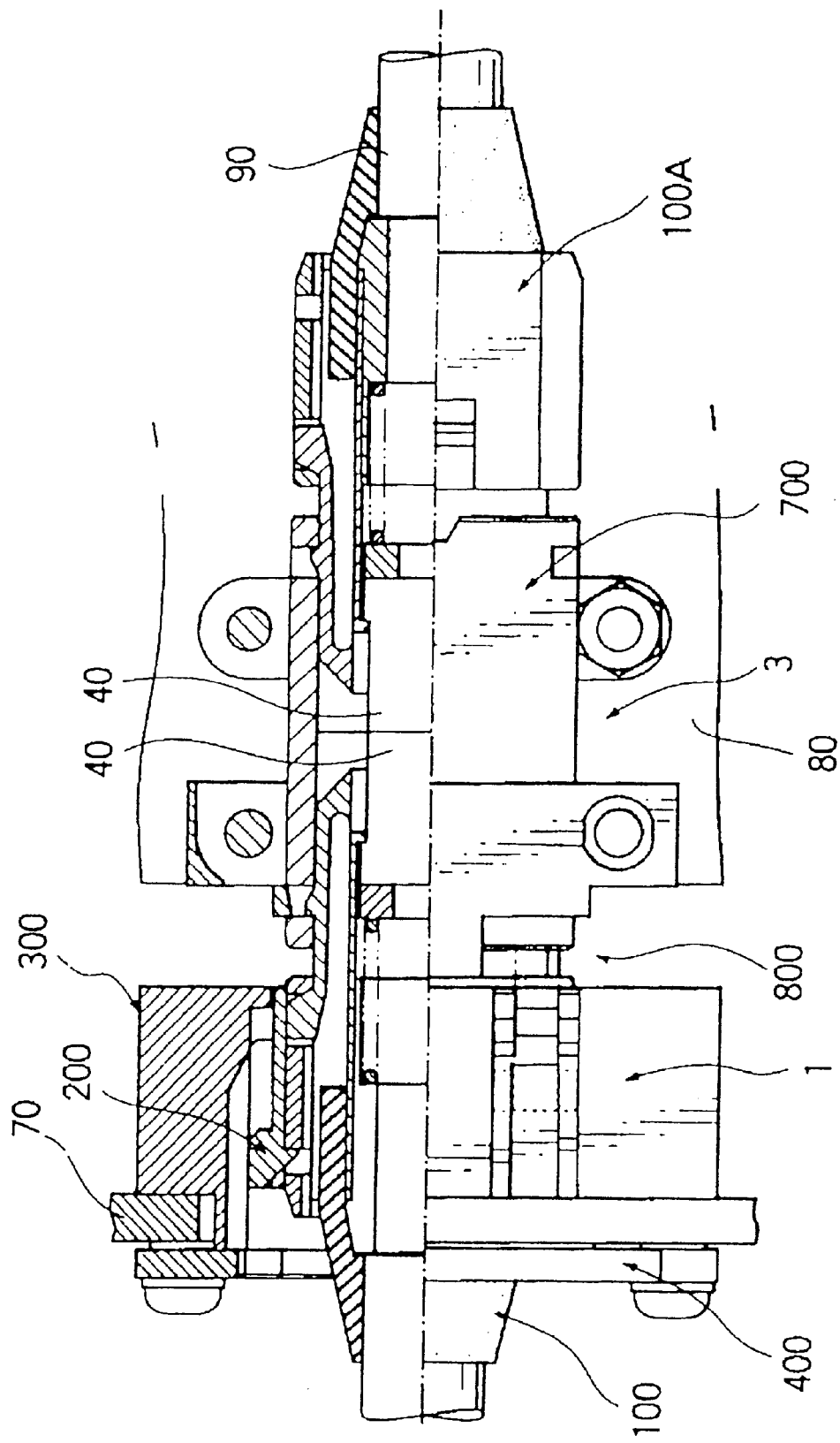
FIG. 8 is a top view of the use of the connectors.

FIG. 8 shows how to use the connector corresponding to FIGS. 6(b) and 7(b). Both the plug connector element 100 and the jack connector element 100A are locked to the PA adaptor housing 700 of the jack connector 3. The connector elements 100 and 100A are connected to optical fibers, and the ferrules 40 projecting from the front ends of the connector elements are connected to each other within the PA adaptor housing 700.

The plug connector 1 is fixed to the board 70 such that the outside housing 300 and the back housing 400 flank the board 70. The jack connector 3 is fixed to the board 80 with screws through the holes 711 (FIG. 4) of the PA adaptor housing 700 and holes 821 (FIG. 4) of the PA housing 800. The plug connector 1 is fixed to the board 70 with a play so that the plug connector is connected to the jack connector without difficulty even if there is a gap between the plug and jack connectors.

The board 80 on which the jack connector 3 is mounted is placed on a rail (not shown) so that the board 80 slidably moved toward the board 70 to connect the plug connector 1 and the jack connector 3. If a plurality of connectors are mounted on the boards 70 and 80, a plurality of optical fibers are connected at once. Since the connector elements are plugged and locked to the jack connector individually, each of the optical fibers is plugged and locked.

The application of the invention is not limited to the optical connector but possible to electrical or other connectors.

By providing a locking mechanism for each connector element, it is possible to plug-lock each connector element.

Even if there is a gap between the plug connector and the jack connector, a play of the connector element in the plug connector makes possible stable connection between the connectors.

What is claimed is:

1. A connector comprising a plug connector and a jack connector;
    said plug connector comprising a plug connector element to which a first connection member is connected, and a housing for slidably receiving said plug connector element, said plug connector element including a first engaging member;
    said jack connector comprising a removable jack connector element to which a second connection member is connected, and an adaptor housing for plug-locking said removable jack connector element, said adaptor housing including a second engaging member;
    said plug connector element of said plug connector being plug-locked to said adaptor housing of said jack connector through engagement between said first engaging member of said plug connector and said second engaging member of said jack adaptor housing for connection with said jack connector element of said jack connector when said plug connector is plugged in said jack connector.

2. A connector comprising a plug connector and a jack connector;
    said plug connector comprising a plug connector element to which a first connection member is connected, and a housing for slidably receiving said plug connector element, said plug connector element including a first engaging member;
    said jack connector comprising a jack connector element to which a second connection member is connected, an adaptor housing for plug-locking said jack connector element, and a housing provided over said adaptor housing, said adaptor housing including a second engaging member;
    said housing of said plug connector being engaged with said plug connector element but, when said plug connector is pressed against said jack connector beyond a predetermined degree, said housing of said jack connector releasing said housing of said plug connector from said plug connector element so that said plug connector element becomes slidable with said housing of said plug connector;
    said plug connector element of said plug connector being plug-locked to said adaptor housing of said jack connector through engagement between said first engaging member of said plug connector and said second engaging member of said jack adaptor housing and connected to said jack connector element of said jack connector when said plug connector is plugged in said jack connector.

3. A plug connector to be plugged in a jack connector, comprising:
    a plug connector element to be connected to a connection member;
    a housing for slidably receiving said plug connector element, said plug connector element including a first engaging member;
    said jack connector comprising a second engaging member;
    said plug connector element being plug-locked to said jack connector through engagement between said first engaging member of said plug connector and said second engaging member of said jack connector and connected to a jack connector element of said jack connector when said plug connector is plugged in said jack connector.

4. A connector according to claim 1, wherein said housing of said jack connector comprises a pull-back member which engages said connector element of said plug connector when the plug connector is plugged in said jack connector and brings said connector element to a position before said engagement is released.

5. A connector according to any one of claims 1–4, wherein each of said plug connector element and said jack connector element comprises a connector element body and a slider slidably attached to said connector element body, when said slider is moved with respect to said connector element body, its engagement with said adaptor housing provided on said connector element body is moved to release engagement between said connector element and said adaptor housing.

* * * * *